May 15, 1962 J. O. HRUBY, JR 3,034,728
LAWN SPRINKLERS
Filed June 20, 1960 2 Sheets-Sheet 1

INVENTOR.
JOHN O. HRUBY, JR.
BY
Beehler & Shanahan
ATTORNEYS.

May 15, 1962  J. O. HRUBY, JR  3,034,728
LAWN SPRINKLERS
Filed June 20, 1960  2 Sheets-Sheet 2
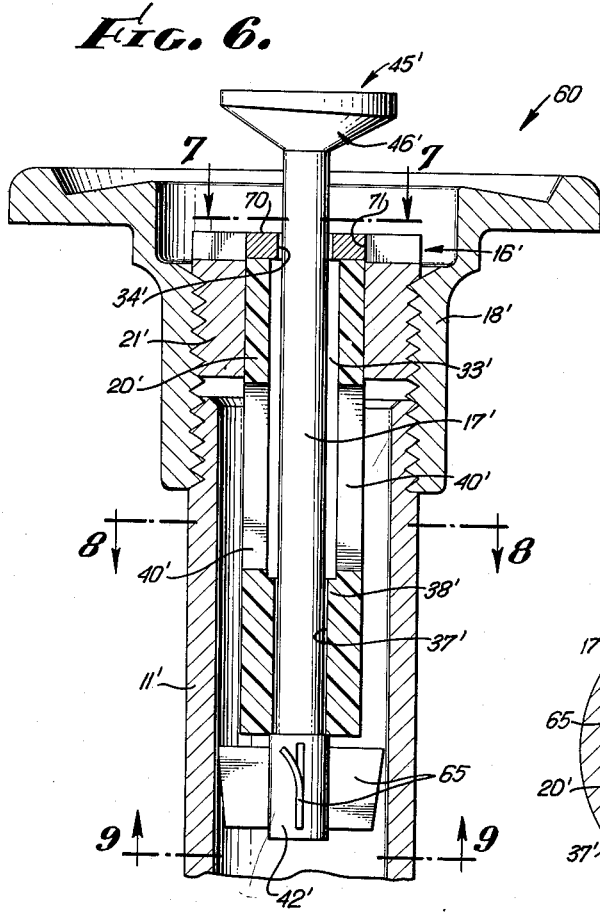
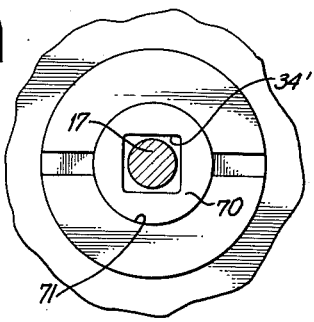
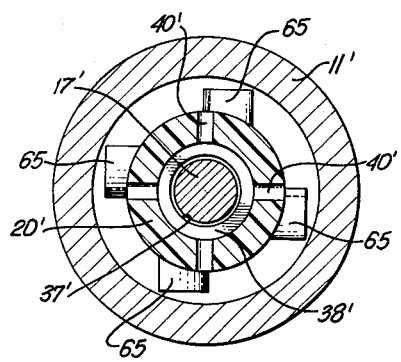
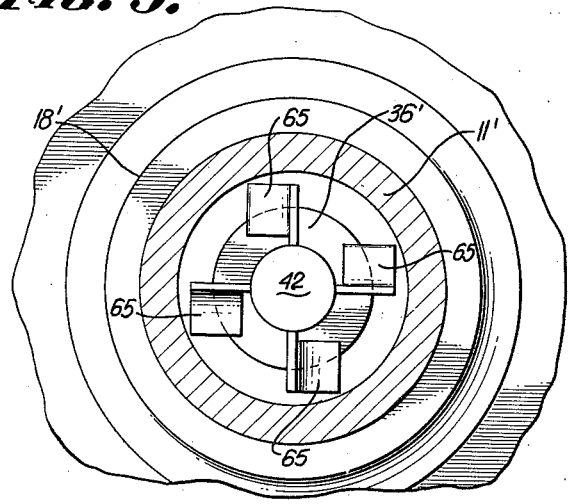
INVENTOR.
JOHN O. HRUBY, JR.
BY
Beehler & Shanahan
ATTORNEYS.

United States Patent Office 3,034,728
Patented May 15, 1962

3,034,728
LAWN SPRINKLERS
John O. Hruby, Jr., Burbank, Calif., assignor, by mesne assignments, to Rain Jet Corporation, Burbank, Calif., a corporation
Filed June 20, 1960, Ser. No. 37,497
4 Claims. (Cl. 239—206)

This invention relates to improvements in lawn sprinklers, and more particularly, to sprinklers of the type having a centrally disposed and vertically extending stem which is made to rotate by the action of water passing through the sprinkler. The sprinklers of this invention are characterized by a head on the upper end of the sprinkler stem which deflects water radially outwardly around the sprinkler at continuously varying degrees of elevation thereby to produce a spray pattern of large area extending from adjacent the sprinkler to the periphery of the area to be sprayed.

The general objects of this invention are to provide lawn sprinklers of the above-mentioned character which are simple and rugged in construction, reliable and efficient in operation, and adapted to be manufactured at low cost.

The advantageous features of sprinklers of this invention will become apparent during the course of the following part of this specification wherein the details of construction and mode of operation of two embodiments of the invention are described with reference to the accompanying drawing, in which.

FIG. 6 is a central vertical section through another form of sprinkler embodying this invention, the rotary stem thereof being shown in side elevation; and, FIGS. 7, 8 and 9 are cross sections, on an enlarged scale, taken along lines 7—7, 8—8 and 9—9 respectively, in FIG. 6.

Figure 1:
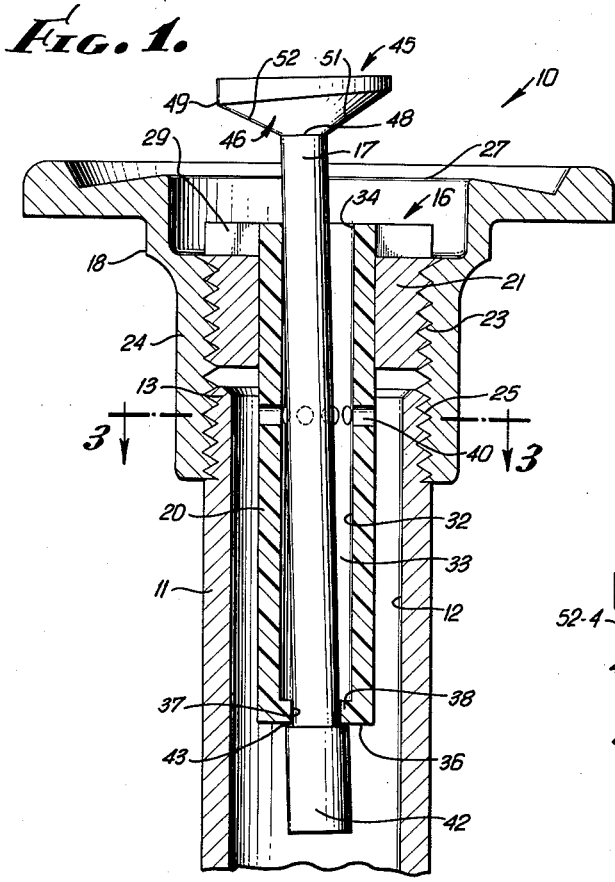
FIG. 1 is a central vertical section through one form of a sprinkler embodying this invention, with the rotary stem of the sprinkler being shown in side elevation.
Figure 2:
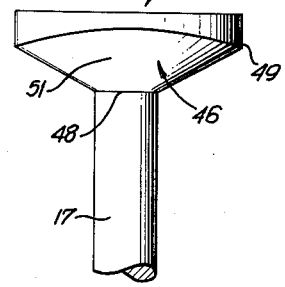
FIG. 2 is an enlarged side elevation of the upper end portion of the stem of the sprinkler, viewed from the right hand side of FIG. 1.
Figure 3:
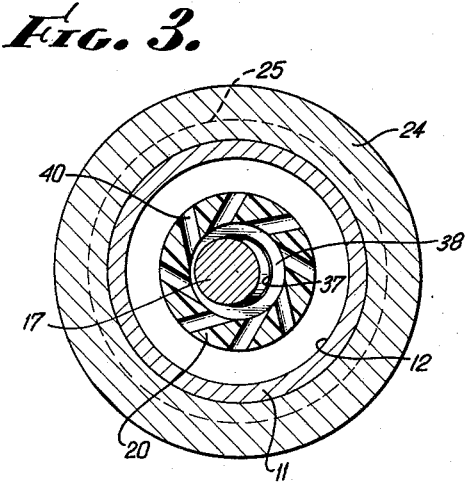
FIG. 3 is a cross section, on an enlarged scale, through the sprinkler taken along line 3—3 of FIG. 1.

Referring to FIGS. 1-3 in detail, there is shown a sprinkler head embodying this invention, the head being designated, generally, by reference numeral 10, and being mounted atop a riser pipe 11 of a lawn sprinkler installation which supplies water to the sprinkler head. The inside surface of the riser pipe is designated by reference numeral 12, and the upper end of the pipe by numeral 13.

Sprinkler head 10 comprises a hollow body 16 extending axially into the upper end of the pipe, a rotatable stem 17 in the body, and a casting 18 for mounting the body upon the upper end of the riser pipe. The body 16 comprises a rigid tube 20 and a collar 21 around the tube, the tube being force-fitted or otherwise suitably secured in the collar. The collar is screw threaded at 23 for positioning the body 16 in the casting 18. The casting has a skirt portion 24 which is internally screw threaded at 25 for mounting the sprinkler head on the riser. There is a recess 27 formed in the casting for positioning the body in the casting with the upper end surface 28 of the body spaced below the top surface of the casting. Two diametrically opposed grooves 29 are formed in the upper end surface 28 of the collar portion of the body to accommodate a spanner wrench (not shown) for turning the body into the casting.

Numeral 32 designates the inside cylindrical surface of the body tube 20, such inside surface defining a body cavity or bore 33 and a water-discharge opening 34 in the upper end of the body. The lower end surface of the body is designated by numeral 36, it having a centrally disposed opening 37 which is of smaller diameter than the bore 33 thus leaving an inside annular flange or shoulder 38, the inside circumference of which defines the lower end opening 37.

Formed in the side walls of the body 16 is a plurality of apertures 40 for admitting water into the body cavity from the riser 11. In the illustrated embodiment these apertures are formed as bores, though they may take the form of narrow slits extending longitudinally of the body tube. As best shown in FIG. 3, the apertures 40 extend through the cylindrical side wall of the body tube 20 at an angle with respect to the radii of the body cavity, here tangentially with respect to the cylindrical inside surface 32 of the body tube, thus to cause the water entering the body cavity to impart rotation or upward spiral motion to the water in the body cavity.

Stem 17 is arranged longitudinally in the body cavity, the stem extending upwardly beyond the discharge opening 34 and downwardly through the lower end opening 37 of the body. The stem is substantially smaller in diameter than the discharge opening 34. The lower end opening 37 of the body is only slightly larger in diameter than the stem, enough so that the lower end opening will accommodate rotation of the stem on its longitudinal axis and sufficient inclination of the stem with respect to the axis of the body cavity to permit engagement of the stem with the upper end of the inside wall surface 32 which defines the discharge opening 34.

There is a stop means in the form of a collar 42 secured on the lower end of the stem for preventing removal of the stem out through the discharge opening.. The stem is movable longitudinally in the body cavity where the illustrated embodiments are of the "pop-up" type, i.e., when water is turned on to the system, the stem moves upwardly to the position thereof shown in FIG. 1 by the force of water flowing through the sprinkler head. The extent of upward movement of the stem in the body is limited by engagement of the upper end face or shoulder 43 of the collar against the lower annular end surface 36 of the body.

The stem may be a solid rod or otherwise suitably closed against passage of water axially through the stem.

At its upper end the stem has a head 45 which is larger in diameter than the discharge opening 34 whereby when water to the sprinkler is turned off, the stem will drop down in the body to a position in which the head covers the discharge opening 34. Undersurface 46 of the stem head is inclined upwardly with respect to a plane perpendicular to the stem axis so as to deflect water from the discharge opening radially outward around the sprinkler.

As thus far described, the sprinkler head 10 is similar to the sprinkler head shown in FIG. 6 of U.S. Patent No. 2,589,942, issued March 18, 1952. A review of the explanation of the mode of operation of the sprinkler head of said patent and of the sprinkler heads of U.S. Patent No. 2,639,191, issued May 19, 1953, will make it clear that for the sprinkler head 10 of the instant application, the swirl of water around upwardly in the body cavity 33, because of the slant of the water inlet apertures 40, causes the stem 17 to gyrate around in the body with the axis of the stem being inclined with respect to the axis of the body cavity 33. By being so gyrated, the stem contacts the surfaces which define the discharge opening 34 and the lower end opening 37 whereby the stem rolls along these surfaces and thus rotates on its axis.

The tubular portion 20 of the body 16 is preferably formed of wear-resistant laminated phenolic composition to increase the life of the sprinkler.

The spray produced by outward deflection of water by the undersurface 46 of the stem head is one in which the water is deflected to a higher elevation from one side of the stem than at its opposite side because of the inclination of the stem. The spray pattern thus produced is of wide area, measured radially with respect to the sprinkler, because of the continuously varying degrees of elevation of water around the sprinkler as the stem gyrates around in the sprinkler body.

This invention is directed to substantially increasing the width of the spray pattern, measured radially of the pattern with respect to the sprinkler at its center. In particular, the undersurface 46 of the stem head is inclined throughout a substantial sector thereof greater than a diametrically opposed sector. In the illustrated embodiment such difference in inclination of opposite sectors of the undersurface 46 is provided by making the undersurface of frusto-conical configuration and with the axis of the frusto-conical undersurface being inclined with respect to the axis of the stem. Thus, in the illustrated embodiment the frusto-conical undersurface 46 extends from its lower extent 48, which is contiguous the outside surface of the stem, upwardly to the periphery 49 of the head, whereby the 180° sector 51 of the undersurface 46 at the right hand side of the stem as viewed in FIG. 1 has an upward inclination which is greater than the 180° sector 52 of the undersurface 46 on the lefthand side of the stem. The uniform change in degree of inclination of the undersurface of the head around the stem substantially increases the extent of variation in the elevation of water from the stem thereby to increase the radial dimension of the ring of the sprayed area such that the spray pattern extends from immediately adjacent around the stem and uniformly out to the periphery of the area being sprayed.

As is well known by those skilled in the art of sprinkler design, the density of water droplets throughout the spray pattern is affected by such factors as water pressure and the relative sizes of the discharge opening 34, cavity 33, stem 17, and water inlet openings 40, and the degree of slant of the inlet openings 40. For a given sprinkler head which is designed to spray water over a predetermined area for a selected range of water pressures, it may be found that the density of water droplets throughout one annular portion of the sprayed area is greater or less than that of another concentric annular portion. According to this invention, sprinklers may be formed to provide for uniform density of water from adjacent the sprinkler out to the periphery of the sprayed area.

Figure 4:
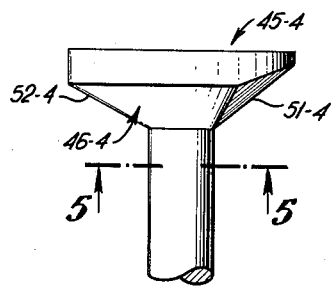
FIG. 4 is a side elevation of another form for the upper end portion of a stem for sprinklers of this invention.
Figure 5:
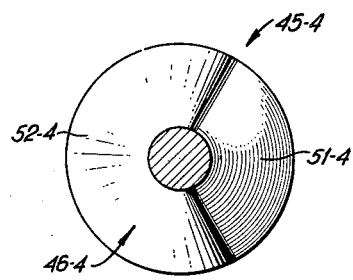
FIG. 5 is a cross section taken on line 5—5 of FIG. 4.

Referring to FIGS. 4 and 5, there is shown a stem head 45–4 of this invention, having an upwardly inclined undersurface 46–4, with a sector 51–4 thereof being upwardly inclined to a greater degree than is the remaining sector 52–4. In this case the sector 51–4 is about 120° in extent and the sector 52–4 is about 240° in extent, whereby the undersurface 46–4 may be likened to a circular cam surface having a dwell portion 51–4 of about 120° in extent. It will be found that for the dwell sector 51–4, water from the discharge opening 34 will be deflected out toward the periphery of the area being sprayed, thereby to increase the amount of water sprayed out toward the peripheral area. It will, of course, be understood that dwell sectors of sizes other than 120° are herein contemplated for altering the density of water droplets in a spray pattern and that the dwell sectors may be greater or less in degree of inclination than that shown in the illustrated embodiments; however, it is to be noted that sectors of less than about 60° in width are too narrow to produce an appreciable effect with respect to varying the density of water droplets in portions of the spray pattern, and that narrow sectors cause undesired splashing.

The concept of this invention of providing for continuously varying degree of elevation of water deflection around the stem by shaping the undersurface of the head as described above, may be embodied in a sprinkler such as shown in FIGS. 6–9 of the drawing in which the stem is not caused to gyrate around in the body and be inclined on its axis, but instead merely rotates on its vertical axis. The sprinkler head of FIGS. 6–9 is designated generally by reference numeral 60. Many of its component parts are similar in construction to corresponding parts in the previously described sprinkler head 10. For purposes of simplicity in this detailed description of the construction of sprinkler head 60, those parts thereof which correspond to parts of sprinkler 10 are designated with the same reference numerals as are employed in FIGS. 1 to 3, but for the case of the sprinkler 60 of FIGS. 6–9 the reference characters employed therein are differentiated from those in FIGS. 1–3 by means of primed (′) reference characters.

Thus, the sprinkler head 60 is shown as being mounted upon a riser 11′ by means of a casting 18′, the casting receiving a hollow body portion 16′, having a tubular portion 20′. Such tubular portion 20′ defines an inside cavity 33′, a discharge opening 34′, a circumferentially arranged series of water inlet openings 40′, and an inside annular flange 38′ which defines a lower end opening 37′. A stem 17′ extends axially through the tubular portion 20′ of the body, the stem having a head 45′ at its upper end, the undersurface 46′ of the stem head being of frusto-conical configuration with the axis of such frusto-conical undersurface being inclined with respect to the axis of the stem as in the embodiment shown in FIGS. 1–3.

Stem 17′ of sprinkler head 60 rotates on its axis and remains concentric within the discharge opening 34′. Thus the lower end flange portion 38′ is of a greater dimension taken axially of the tubular portion 20′ than is the corresponding flange 38 of sprinkler head 10, whereby in the case of sprinkler head 60 an axially longer supporting surface for the stem 17′ is provided to maintain the stem 17′ concentric in the discharge opening 34′.

Also, in the case of sprinkler head 60, the inlet apertures 40′ are not inclined with respect to the radii of the tubular portion 20′, but instead extend radially through the side walls of the tubular portion 20′. Furthermore, the inlet apertures 40′ are slits extending longitudinally in the tubular portion 20′. The inlet apertures 40′ are not slanted because in the case of sprinkler head 60 rotation of the stem 17′ is caused by vanes 65 secured on the lower end of the stem. There are four such vanes 65 in the illustrated embodiment of FIGS. 6–9 and these extend in a circumferentially arranged series of uniformly spaced apart vanes around the lower end of the stem. The vanes are secured to a lower end collar 42′ which is fixed non-rotatably on the lower end of the stem.

As in the case of the sprinkler head 10, the stem 17′ of sprinkler head 60 is of greater axial length than the tubular portion 20′ of hollow body 16′, whereby a sprinkler head 60 is of the "pop-up" type in which the force of water flowing through the sprinkler head raises the stem to its upwardly disposed position shown in FIG. 6, the collar 42′ serving to prevent removal of the stem vertically from within the sprinkler body. When the water supply to the sprinkler is turned off, the sprinkler stem will drop down to a position, not shown, where the undersurface 46′ of the stem head rests upon the inside rim of tubular portion 20′ which defines the discharge opening 34′.

As best appears in FIG. 6, the vanes 65 are slanted with respect to radial planes through the stem 17′. Thus as water flows upwardly in the riser 11′ to enter the sprinkler head 60 through the water inlet slits 40′, such water in passing through the riser will impinge against the inclined surfaces of the vanes 65 thereby to deflect the vanes in a direction toward the right, as viewed in FIG. 6, to impart rotation to the stem 17′.

Sprinkler heads of the type shown in FIGS. 6–9 may be constructed to form non-circular spray patterns. For the purpose of illustrating one such construction for a non-circulary spray pattern, sprinkler head 60 is illustrated as being in a form which will produce a square spray pattern. To this end, the discharge opening 34' is a square opening, it being formed in a plate 70 which is secured in the upper end of the body 16' as by being force-fitted in a circular recess 71 formed in the collar portion 21' of the body 16'.

As the stem 17' rotates on its vertical axis, water flowing in an axial direction out through the square discharge opening 34' and around the outside surface of the stem will impinge against the undersurface 46' of the stem head 45' and will be deflected radially outwardly around the stem to cover a square area of lawn. Inasmuch as the upward inclination of the undersurface 46' constantly varies circumferentially around the stem, the angle of deflection of water from the discharge opening will continuously vary such that the degree of elevation of deflected water around the sprinkler head will constantly vary. In this way, then, a square area of wide radial width will be covered by direct spray from the sprinkler. By controlling the force of water to the sprinkler, the sprinkler may be caused to spray water over the area immediately around the sprinkler head.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

Having described the invention, what is claimed as new in support of Letters Patent is:

1. A lawn sprinkler comprising, a vertically extending water supply pipe having a water discharge opening at its upper end, a stem smaller than said opening and extending downwardly therethrough, means responsive to flow of water in said pipe for rotating said stem about a vertical axis, a laterally extending head on said stem above said opening, the undersurface of said head sloping upwardly and outwardly from said stem to deflect water issuing from said opening in lateral directions, the slope of said undersurface being greater throughout a substantial sector of said undersurface than throughout another substantial sector whereby as the stem is rotated on its axis water from said discharge opening is deflected laterally by said undersurface at continuously varying degrees of elevation around said sprinkler.

2. A lawn sprinkler as defined in claim 1 wherein said undersurface is frusto-conical with the axis thereof being inclined with respect to the longitudinal axis of said stem.

3. A lawn sprinkler as defined in claim 1 wherein said stem is laterally tiltable within the confines of said discharge opening, said means for rotating said stem also causing said stem to roll around the periphery of said discharge opening.

4. A lawn sprinkler as defined in claim 1 wherein the slope of said undersurface is substantially uniform throughout one of said substantial sectors.

References Cited in the file of this patent
UNITED STATES PATENTS

| | | |
|---|---|---|
| 1,271,939 | Reeves | July 9, 1918 |
| 1,882,922 | Robinson et al. | Oct. 18, 1932 |
| 2,221,878 | Nelson | Nov. 19, 1940 |
| 2,509,076 | Royer | May 23, 1950 |
| 2,619,378 | Watkins et al. | Nov. 25, 1952 |
| 2,639,191 | Hruby | May 19, 1953 |
| 2,756,099 | Reynolds | July 24, 1956 |
| 2,943,798 | Rienks | July 5, 1960 |